Patented Nov. 27, 1951

2,576,743

UNITED STATES PATENT OFFICE 2,576,743

PREPARATION OF 4-ETHYLCYCLOHEXENE

Owen Clement Wentworth Allenby, McMasterville, Quebec, Canada, assignor to Canadian Industries Limited, Montreal, Quebec, Canada, a corporation of Canada No Drawing. Application May 9, 1947, Serial No. 747,129. In Canada August 16, 1946

2 Claims. (Cl. 260—666)

It is an object of this invention to reduce 4-vinylcyclohexene by preferential hydrogenation of the vinyl double bond thereby to prepare 4-ethylcyclohexene.

It has been found that the objects of this invention may be accomplished by the hydrogenation of 4-vinylcyclohexene with slightly more than 1 equivalent of hydrogen in the presence of a hydrogenation catalyst.

Under the preferred conditions of the present invention, 4-vinylcyclohexene is hydrogenated in the presence of a solvent and an active hydrogenation catalyst such as Raney nickel with agitation of the reactants. The reaction is exothermic and cooling is necessary to maintain the preferred temperature of 10–20° C. Reduction is continued until slightly more than 1 mole of hydrogen per mole of 4-vinylcyclohexene has been absorbed at which point a rapid drop in the rate of reduction occurs.

The practice of my invention is illustrated in greater detail by the following examples. There are, of course, many forms of the invention other than these specified embodiments, and these examples are to be considered as being illustrative only and not as limiting the scope of the invention.

EXAMPLE I

A mixture of 108 g. (1 mole) of 4-vinylcyclohexene, 75 cc. of anhydrous ethyl alcohol and Raney nickel catalyst is agitated in a three-necked flask equipped with a mercury-sealed Hirschberg stirrer, a thermometer and a hydrogen inlet. After flushing well with hydrogen, the system is closed and hydrogen allowed to pass in until slightly more than 1 mole has been absorbed (as measured from a gas burette). Cooling with a water bath is necessary to keep the temperature at 10–20° C. The catalyst is removed by filtration, the liquid diluted with water, saturated with salt and the product layer extracted with ether. After drying the ether solution over calcium chloride, the mixture is distilled through an efficient column. Based on the amount of 4-vinylcyclohexene used, an 80% yield (88 g.) of 4-ethylcyclohexene is obtained, having the following properties: B. P.=132–132.8; $n_D^{25}$=1.44688; $D_4^{25}$=0.811.

EXAMPLE II

A mixture of 18 g. of 4-vinylcyclohexene, 40 cc. of anhydrous ethyl alcohol and 0.52 cc. of centrifuged Raney nickel catalyst are agitated by shaking in a reactor consisting of a glass tube 4x30 cm. in size, equipped with a hydrogen inlet in the centre. Cooling is provided by passing water through a cold finger, inserted into the reactor through a ground glass joint and the temperature is thus maintained at 10–20° C. The reactor is suspended horizontally from a rocker arm 12 inches in length and agitation is at the rate of 350 strokes 3½ inches in length per minute. Hydrogen is passed into the mixture and is measured from a gas burette. The amounts of hydrogen taken up at the end of various time intervals are graphed, and from the resulting curve the half-time intervals (t0.5) for saturation of each of the bonds determined. This procedure results in a rate at the half-time interval of 71 cc./min. for the vinyl bond and 7.5 cc./min. for the cyclohexene bond.

The same procedure carried out for an identical series of experiments, in which the amount of catalyst only is varied, gives the results tabulated below:

Table I

REDUCTION OF 4-VINYLCYCLOHEXENE WITH VARIATION IN CATALYST CONCENTRATION

| Vol. of Catalyst, cc. | Rate at t0.5 (cc./min.) | | Ratio A:B |
|---|---|---|---|
| | Vinyl Bond (A) | Cyclohexene Bond (B) | |
| 0.52 | 71 | 7.5 | 9.6 |
| 0.59 | 130 | 13.0 | 10.0 |
| 0.70 | 167 | 15.6 | 10.7 |
| 1.18 | 250 | 23.3 | 10.7 |
| 1.95 | 250 | 27.0 | 9.3 |

EXAMPLE III

A number of solvents other than ethyl alcohol (described in Example I) may be used. For example, 18.0 g. of 4-vinylcyclohexene, 40 cc. of anhydrous methyl alcohol and 0.6 cc. of Raney nickel catalyst are agitated in the apparatus described in Example II. The rates of hydrogenation at the half-time intervals for the two bonds are found to be 334 cc./minute for the vinyl bond and 34.5 cc./minute for the cyclohexene bond.

In the table below a number of solvents are compared with one another, using the conditions outlined above.

Table II

| Solvent | Vol. of Catalyst cc. | Rate at t0.5 cc./min. | | Ratio A:B |
|---|---|---|---|---|
| | | Vinyl Bond (A) | Ring Bond (B) | |
| Methanol | 0.6 | 334 | 34.5 | 9.7 |
| Acetic Acid | 1.9 | 147 | 4.0 | 36.8 |
| Ether | 1.9 | 135 | 39.5 | 3.4 |
| Ethanol | 0.7 | 53 | 6 | 8.8 |
| Benzene | 1.9 | 53 | 5.9 | 9.3 |

EXAMPLE IV

A mixture of 18.0 g. of 4-vinylcyclohexene and 1.95 cc. of Raney nickel catalyst are agitated by shaking in the apparatus described in Example II. The rate of hydrogen absorption is followed by measurement from a gas burette in a manner also described in Example II. A change in the hydrogenation rate occurs after the addition of slightly more than 1 mole of hydrogen, the rates at the half-time interval being 61 cc./min. for the first portion of the curve and 19 cc./min. for the second portion of the curve. From this it is apparent that the presence of a solvent is unnecessary in the reduction of 4-vinylcyclohexene.

EXAMPLE V

Hydrogen gas is introduced into a mixture of 36 g. (⅓ mole) of 4-vinylcyclohexene dissolved in 30 cc. of cyclohexanol containing 1.5 cc. of centrifuged Raney nickel catalyst. The apparatus described in Example II is employed, the reactor being wound with a heating element. The reduction is carried out at 100° C. and discontinued when slightly more than one equivalent of hydrogen has been absorbed. The catalyst is removed by centrifuging and the clarified liquid fractionated. An 85% yield 4-ethylcyclohexene (B. P. 131–132.5%° C.) is obtained.

EXAMPLE VI

A palladium-on-"Nuchar" catalyst which ordinarily will not hydrogenate 4-vinylcyclohexene at room temperature and pressure, operates very satisfactorily when high pressures are used.

Shaking is accomplished in an apparatus essentially similar to that described in Example II, and designed to withstand high pressures. This consists of a stainless steel cylinder, 3″ in diameter and 8″ in depth, having a capacity of approximately 930 cc. and of a strength to withstand the pressures employed. The reactor is suspended from a rocker arm 13½″ in length and shaken through a 20° arc at the rate of 180 strokes per minute. A hydrogen inlet is provided at the centre, also a cooling jacket, thermocouple and plug for filling and emptying. The hydrogen inlet is connected through a spiral of copper tubing to a reservoir, to which is attached a pressure gauge and rupture disc. The size of the reservoir and the amount of material hydrogenated are so adjusted that a pressure drop of 100 lbs. from the initial pressure of 250 lbs. takes place. In this particular case a reservoir of approximately 700 cc. capacity was employed. Into this apparatus is charged a mixture of 27 g. (0.25 mole) of 4-vinylcyclohexene, 125 cc. of reagent methanol and about 4 g. of palladium-on-"Nuchar" catalyst. After flushing, the system is filled with hydrogen to a pressure of 250 lbs. per in.² With efficient agitation reduction proceeds rapidly, sufficient hydrogen being taken up in about ten minutes to hydrogenate one double bond per molecule.

EXAMPLE VII

A 0.5% platinum-on-alumina catalyst which is ordinarily ineffective in the hydrogenation of 4-vinylcyclohexene at room temperature and atmospheric pressure, is quite efficient when employed at 250 lbs. pressure. A mixture of 27.0 g. of 4-vinylcyclohexene, 3.4 g. of 0.5% platinum-on-alumina catalyst (finely ground) and 125 cc. of anhydrous methyl alcohol is treated with hydrogen at 250 lbs. per in.² in the apparatus described in Example VI. The correct amount of hydrogen is absorbed in approximately 30 minutes when the reaction is stopped.

Reduction of 4-vinylcyclohexene to 4-ethylcyclohexene may be carried out over a wide temperature range, depending on the amount and type of solvent or catalyst. In general, any temperature between 0° C. and the boiling point of the mixture under the pressure used may be employed. Higher temperatures are not suitable with certain catalysts, particularly in the vapour phase, because the 4-vinylcyclohexene isomerizes to ethylbenzene and ethylcyclohexene, as described in Sergienko (C. A. 33; 3329) R. Ya-Levina and S. Ya-Levina (C. A. 33; 4966) and Sergienko (C. A. 34; 5418).

In the reduction of 4-vinylcyclohexene to 4-ethylcyclohexene efficient agitation is of utmost importance. Otherwise, although reduction takes place slowly, the true hydrogenation rate is obscured by the rate of solution of hydrogen in the mixture. The latter then being the significant factor, the hydrogenation curve shows no obvious break after the absorption of one equivalent of hydrogen. Any calculations based on such data are quite erroneous and a false indication of the extent of preferentiality of reduction obtained. However, if the reduction is stopped after the addition of one equivalent of hydrogen under these conditions the product is substantially the same as that produced by hydrogenation with efficient agitation.

While Raney nickel is the preferred catalyst, others having hydrogenation properties such as palladium, platinum, cobalt, ruthenium, etc., may be employed. Preferably the catalyst is added as a suspension in the solvent used for dissolving the 4-vinylcyclohexene but any variation in the order, rate or methods of addition of the catalyst, solvent, 4-vinylcyclohexene or hydrogen is permissible as will be apparent to those skilled in the art.

Hydrogenation of 4-vinylcyclohexene may be carried out in the absence of a solvent but generally, use of a solvent is preferred since it provides better contact between the hydrogen, the catalyst and the reactant, which strongly influences the rate of reaction. In general, I prefer the use of alcohols as solvents since they provide the greatest absorption capacity for hydrogen and are most easily removed from the reaction mixture. However, any solvent which does not poison the catalyst may be used as a diluent, provided it does not adversely effect the catalyst's action by coagulation, and is comparatively inert to the reactants. Such solvents include ethyl alcohol, methyl alcohol, acetic acid, benzene, ether and cyclohexanol. When using Raney nickel as hydrogenation catalyst certain precautions must be taken to prevent coagulation of the catalyst. It is especially important to use dry hydrogen and to have the catalyst free from traces of solvent immiscible with the medium in which the hydrogenation is being carried out. An effective procedure is to wash the catalyst several times with dry methanol and finally with 4-vinylcyclohexene itself. If such precautions are not taken, the catalyst tends to coat out on the sides of the reaction vessel. When hydrophobic solvents, such as benzene or ether, are used dry hydrogen is essential if coagulation of the catalyst is to be prevented.

4-ethylcyclohexene may be used in the preparation of intermediates for linear polyamides of the nylon type and of polyesters and polyesteramides.

Since it is obvious that various changes and modifications may be made in the above description without departing from the nature or spirit thereof, this invention is not restricted thereto except as set forth in the appended claims.

Having thus described my invention what I claim is:

1. A process for the preparation of 4-ethylcyclohexene which comprises reacting 4-vinylcyclohexene with hydrogen in the presence of a nickel catalyst and an aliphatic alcohol selected from the group consisting of methanol and ethanol at 10–20° C. until slightly more than 1 mole of hydrogen has been absorbed for each mole of 4-vinylcyclohexene.

2. A process for the preparation of 4-ethylcyclohexene which comprises reacting 4-vinylcyclohexene with hydrogen in the presence of a nickel catalyst and methanol at 10–20° C. until slightly more than 1 mole of hydrogen has been absorbed for each mole of 4-vinylcyclohexene, and separating 4-ethylcyclohexene from the reaction mixture.

OWEN CLEMENT WENTWORTH ALLENBY.

REFERENCES CITED

The following references are of record in the file of this patent:

UNITED STATES PATENTS

| Number | Name | Date |
|---|---|---|
| 1,879,767 | Schoeller et al. | Sept. 27, 1932 |

OTHER REFERENCES

Lebedew et al.: Chemiches Zentrablatt, page 1440, I (1912).

Mousseron et al.: Comptes Rendus, vol. 206, pages 1486–1488 (1938).

Markownikow: Chem. Zentr., 1903, II, pages 288–289.

Markownikow: Chem. Zentr., 1904, I, page 1346.

Semmler: Beilstein (Handbuch, 4th ed.), vol. 5, page 64 (1922).

Lebedev et al.: Chem. Abstracts, vol. 6, page 855 (1912).